Patented Mar. 6, 1923.

1,447,937

UNITED STATES PATENT OFFICE.

CARLETON ELLIS AND VERNON T. STEWART, OF MONTCLAIR, NEW JERSEY.

PROCESS OF MAKING HYDROCHLORIC AND ARSENIC ACIDS.

No Drawing. Application filed December 17, 1920. Serial No. 431,348.

*To all whom it may concern:*

Be it known that we, CARLETON ELLIS and VERNON T. STEWART, citizens of the United States, and residents of Montclair, in the county of Essex and State of New Jersey, have invented certain new and useful Improvements in Processes of Making Hydrochloric and Arsenic Acids, of which the following is a specification.

This invention relates to a process of making hydrochloric and arsenic acids the latter suitable for use in the manufacture of arsenical compounds. The process relates especially to the treatment of arsenic in a lower stage of oxidation with chlorine to produce arsenic acid on the one hand and hydrochloric acid on the other.

As a raw material for making the hydrochloric and arsenic acid, white arsenic, (arsenic trioxid) preferably is employed and this may be either pure or may be of varying degrees of impurity as derived in commerce. By the treatment with chlorine, arsenic acid of a fairly high degree of purity may be obtained.

The chlorine employed for the purpose is preferably obtained by the electrolysis of brine and may be used without any especial purification and in fact chlorin when contaminated with a certain amount of moisture, air or other gases is suitable for carrying out the present process.

Preferably arsenic trioxide or white arsenic is used as the raw material. This is made up into a suspension with water and a stream of chlorine gas or mixture of chlorine gas and air passed into the suspension yielding arsenic acid and hydrochloric acid. If the proportion of water is largely in excess a dilute solution of arsenic acid and hydrochloric acid is thus obtained. The hydrochloric acid may be separated from the arsenic acid by boiling and suitably collecting the acid distillate. As this procedure involves the use of a large bulk of water and consequent expense in concentration it is possible to use a lesser proportion of water as for example only a sufficient amount of water to produce a paste or thin cream of the white arsenic and by agitating such mixture to effectively react thereon with chlorine gas thus enabling hydrochloric acid to be readily removed from the place of reaction and conveyed to suitable absorbing apparatus. In this operation the batch may be started cold but preferably it is desirable to have the water slightly warm when the mixture is made up as the reaction starts off more quickly. Depending upon the conditions of treatment it may be desirable also to continue the heating during the reaction or on the other hand to cool the apparatus in case the reaction should become too violent and bring about entrainment of arsenic compounds. Water may be introduced slowly into the batch during the reaction if the cream or paste becomes too heavy through evaporation of water and its removal by hydrochloric acid.

The hydrochloric acid obtained from this charge of material is sometimes contaminated with chlorine especially toward the end of the run. It also may contain entrained arsenic oxide or arsenic acid or arsenic chloride. Arsenic acid however is very rarely carried over by the HCl current, and the oxidation of any white arsenic present in the hydrochloric acid affords a means of removal of the major portion at least of any arsenic trioxid present in the gas or vapors. Thus the gas may be passed through an oxidizing scrubber containing permanganate or bichromate of soda in order to oxidize and retain such arsenical impurity.

As stated, toward the close of the run (when the "latch" system is used) a considerable amount of chlorine may be present in the gases or vapors leaving the suspension of white arsenic and to absorb the latter it is desirable to pass the hydrochloric acid gas and associated chlorine into a second absorber containing a fresh charge of white arsenic and water or into chambers having shelves charged with white arsenic. Any impurity of chlorine in the hydrochloric acid gas may be thus sufficiently removed. The fresh charge of material used in this manner for the elimination of chlorine subsequently forms the primary charge in the actual stage of treatment (main treatment) with fresh chlorine gas to produce the hydrochloric and arsenic acids desired. Thus two closed tanks preferably equipped with stirrers may be arranged to operate in series, one being used for carrying out the reaction proper and the second one being used to absorb chlorine present in the hydrochloric acid. After the first tank has been given the necessary treatment to complete the oxidation the latter is used as the chlorine washer while the second tank is used for the fresh charge.

A modified procedure involving a large bulk of water may be used in some cases as for example by using enough water with the white arsenic to absorb the hydrochloric acid and preferably make a fairly concentrated solution of the latter. When the oxidation is complete the solution containing the hydrochloric and arsenic acid is boiled and the hydrochloric acid thus separated from the arsenic acid.

In one case 400 grams of a sample of white arsenic was suspended in 3½ liters of water (forming a suspension containing somewhat over 11% of white arsenic, assuming the arsenic to be substantially pure) and treated with chlorine. The chlorine was allowed to react until the white arsenic was completely oxidized and as a slight sediment formed the solution was filtered. It was then boiled and all the hydrochloric acid and water expelled leaving a residue of dry arsenic acid. On further heating above 140° C. combined water was eliminated yielding a residue of arsenic pentoxide. From the above charge of white arsenic 435 grams of the pentoxide were obtained. The hydrochloric acid yielded by the foregoing operation amounted to 237 grams which would represent over 700 grams of commercial aqueous hydrochloric acid.

In this particular example, the proportions were such as to give as starting material, a suspension of white arsenic in water containing about 11.43% of the white arsenic which (assuming a fair state of purity) would correspond to not substantially less than 11%.

The same favorable results can still be produced if the percentage of arsenic is varied more or less, and this example is intended to be specifically included in certain of the appended claims, under the expression "not substantially less than 11% of arsenic trioxid."

It is, of course, understood that the example is given for illustrative purposes and not as defining the limits or scope of the invention.

Whether or not the arsenic acid is produced by the concentrated batch system or by the dilute system it is usually necessary to filter after oxidation has been completed and the acid solution may be passed through glass wool or asbestos to remove silica and other impurities.

The oxidation also may take place in a tower or series of towers a suspension of the white arsenic in water being allowed to flow down through towers having baffles or filling material so arranged that deposits of white arsenic may not form and clog the passages. In this way the chlorine may be very completely absorbed as the current of gas progresses always into contact with fresh portions of the white arsenic suspension until absorption of the chlorine is complete. This method also has the advantage of being continuous. The solution of arsenic acid and hydrochloric acid obtained at the bottom of the tower may pass through a filter and then into a stripping tank where the hydrochloric acid is continuously removed and by this stripping operation concentrated arsenic acid obtained. It is usually unnecessary to carry the concentration of the arsenic acid to an absolutely dry product and in fact according to the present invention in one form at least it is desired to produce arsenic acid containing 20 to 25% or thereabouts of water. This yields a syrupy product with specific gravity approximately 2.0. The foregoing stripping process may also be applied to the batch system of oxidation.

While in the above procedure we have indicated that chlorine may be introduced at the bottom of the tower in order to secure a counter-current effect, it is not necessary in all cases to do this, the chlorine in some cases being for example added at the top of the tower or at suitable points along the sides thereof so that the chlorine gas moves in a generally downward direction with the flow of the liquid material while absorption is taking place.

In making arsenical compounds from arsenic acid (especially when the latter is used on the premises) it is not always necessary to remove the hydrochloric acid completely or substantially completely, a small amount of hydrochloric acid may be present when making for example calcium arsenate without doing any harm other than to require a somewhat greater quantity of lime than would be required for the arsenic acid alone. The calcium arsenate so formed of course will contain a little calcium chloride. Thus it will be evident that according to circumstances it may be more economical not to divest the arsenic acid completely of its hydrochloric acid. The cost of complete stripping may be such as to render the use of a product containing some hydrochloric acid cheaper and equally advantageous under some conditions.

To review therefore the foregoing process it comprises in its essential features a method of reducing chlorine to hydrochloric acid and of simultaneously oxidizing a compound of arsenic preferably white arsenic to yield arsenic acid and in separating or stripping to a greater or less degree the arsenic acid from the hydrochloric acid and in suitably purifying or concentrating either or both of these products.

In order to get complete reaction between white arsenic or ores containing white arsenic with chlorine it is not desirable to finish the reaction with the solution hot. Better results are obtained by having the solution cold or if hot to cool it toward the end of the oxidation thereby securing complete conversion into arsenic acid. Of course if the arsenic acid is required for purposes other than insecticides it may be permissible to have arsenic in a lower stage of oxidation present. But in making insecticides in accordance with the preferred procedure of the present invention it is highly important and in fact essential to rid the arsenic acid of arsenic trioxide. For example by cooling the solution such complete reaction is satisfactorily established.

What we claim is:

1. A process of making arsenic acid which comprises causing a stream of a suspension containing arsenic trioxid to flow in contact with a gas containing free chlorin, the said suspension containing initially not substantially less than 11% of arsenic trioxid.

2. A process of making arsenic acid which comprises causing a stream of a suspension containing arsenic trioxid to flow in countercurrent contact with a gas containing free chlorin, the said suspension containing initially not substantially less than 11% of arsenic trioxid.

3. A process of making arsenic acid which comprises causing a stream of a warm suspension containing arsenic trioxid to flow in contact with a gas containing free chlorin, the said suspension containing initially not substantially less than 11% of arsenic trioxid.

4. A process of making arsenic acid which comprises causing a stream of a suspension containing arsenic trioxid to flow in contact with a gas containing free chlorin, the said suspension containing only such an amount of water as to leave a syrupy product.

5. The process of making hydrochloric and arsenic acids which comprises allowing an aqueous suspension containing white arsenic to flow downwardly in contact with a counter current of chlorin gas whereby arsenic acid and hydrochloric acid are produced and causing the arsenic acid together with aqueous hydrochloric acid to pass through a hot zone whereby the arsenic acid is stripped in large part at least of the hydrochloric acid.

6. The process of making hydrochloric and arsenic acids which comprises allowing a stream of an aqueous suspension containing white arsenic to flow downwardly in contact with a counter current of chlorine-containing gas whereby arsenic acid and hydrochloric acid are produced, and in causing the arsenic acid together with aqueous hydrochloric acid to pass through a hot zone whereby the arsenic acid is stripped of a large proportion of the hydrochloric acid.

7. The process of making hydrochloric and arsenic acids which comprises allowing a stream consisting of an aqueous suspension of a lower arsenic oxide to flow downwardly in contact with a counter current of chlorine gas, the liquid being hot during a part of such contact, whereby arsenic and hydrochloric acids are produced, and causing the arsenic acid together with aqueous hydrochloric acid to pass through a hot zone whereby the arsenic acid is stripped, in large part at least, of hydrochloric acid.

CARLETON ELLIS.
V. T. STEWART.